Aug. 25, 1959 — C. M. GAFFNEY, JR — 2,900,868
FILM STRIP ATTACHMENT
Filed May 10, 1954

INVENTOR.
CLYDE M. GAFFNEY, JR.
BY
ATTORNEY

United States Patent Office 2,900,868
Patented Aug. 25, 1959

2,900,868

FILM STRIP ATTACHMENT

Clyde M. Gaffney, Jr., Greenville, S.C.

Application May 10, 1954, Serial No. 428,532

4 Claims. (Cl. 88—19.5)

This invention relates to attachment means for fastening motion picture film to reels and for holding the film in place on stored reels which is particularly adapted for use in connection with home movies.

To those skilled in the use of motion picture projectors the inconvenience experienced in starting the film on the take up reel is well known. Normally the reel has a slot or a number of slots in the circular center part or hub of the reel and to attach the film to the reel the user must fold the end of the film down and place this folded end in one of the slots. Since motion picture film is normally brittle, breakage often occurs and the film often slips out of the slot making this operation inefficient and annoying. After the film has been shown and rewound preparatory to storage there is a tendency for the film to unwind and many times the film is damaged in storage due to this unwinding and the resultant exposure of the film to damage and breakage.

Accordingly, it is an object of this invention to provide film attachment means which may be secured conveniently to the end of the film and to the circular center of the reel and which may be employed over and over again for the purpose of attaching the film to the reel.

Another object of my invention is to provide a film strip attachment employing pressure sensitive adhesive means for attaching the end of the film to the strip on one end and for attaching the other end of the strip to the circular center of the reel, the pressure sensitive adhesive means making it possible to readily remove the end attached to the reel after the rewinding operation and to attach this free end to the film being stored on the reel by simply pressing the adhesive coated strip down onto the film.

Another object of my invention is to provide a film strip attachment having the advantages described above and having sprocket holes adjacent its side edges so that upon reaching the end of the film during a showing and the grip of the pressure sensitive adhesive material on the center of the reel has been released, the attachment may be simply pulled through the guides and the sprockets.

Still another object of my invention is to provide a film strip attachment as outlined above which may be cheaply constructed of textile or plastic material and which may be provided with a protective covering preferably of gauze for the portions having adhesive coating which covering may be conveniently removed prior to use.

My invention generally consists of a film strip attachment for temporarily securing a motion picture film to a reel comprising a flexible strip of textile material, a pressure sensitive adhesive coating covering one side of said flexible strip, a flexible hinge strip of textile material stitched adjacent the inner end thereof in the medial portion of said first mentioned flexible strip on said side having said pressure sensitive adhesive coating so that adjacent ends of the hinge strip and said first mentioned flexible strip are aligned, a pressure sensitive adhesive coating on the side of said hinge strip adjacent said first mentioned strip, said first mentioned flexible strip and said hinge strip having a plurality of spaced aligned slots adjacent each edge, adapted to be engaged by the usual sprocket for the purpose of driving the film, a foraminous protective coating of textile material covering the portions having the pressure sensitive adhesive coating and a tab portion at the free end of said first mentioned strip to provide a convenient gripping portion.

Some of the objects of the invention having been stated above others will appear to those skilled in the art relating to motion pictures as the description proceeds when taken in connection with the accompanying drawing in which.

Figure 1:
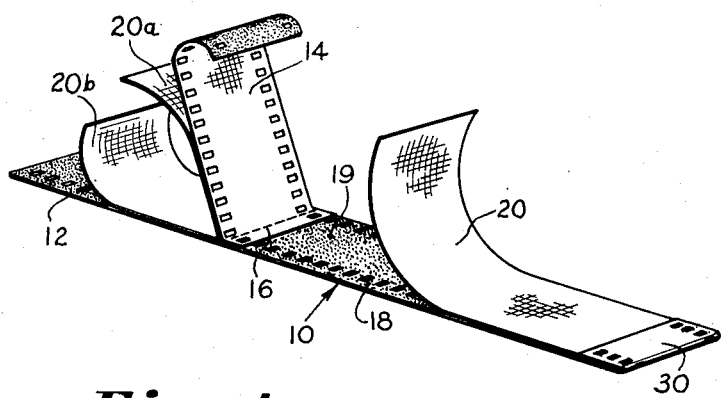
Fig. 1 is a perspective view of the film strip attachment.

Referring more particularly to the drawing the numeral 10 broadly designates the film strip attachment, shown in perspective in Fig. 1. The film strip attachment essentially consists of an elongated strip 12 and a flexible hinge strip 14 suitably secured adjacent its inner end to the upper surface of the flexible strip 12 as by the stitches 16. While the flexible strip 12 may be constructed of any suitable material, as may be the hinge strip 14, it is preferred that a textile material be employed because of the flexibility and long life of this material.

It will be noted that a plurality of spaced aligned slots 18 are provided in the elongated flexible strip 12 to accommodate the teeth of the usual sprocket which is employed to drive the film pulling the same through the guides and past the lens of a motion picture projector. While the above described slots are desirable they are not necessary to carry out the invention, their only purpose being to provide a convenient way for the film strip attachment to pass through the guides and past the sprocket wheel at the conclusion of the showing of the film.

A pressure sensitive adhesive coating 19 is provided along the upper surface of the elongated flexible strip 12 and on the inside, or side adjacent the flexible strip, of the hinge strip 14. It will be noted that foraminous covers 20, 20a and 20b, preferably of gauze, are provided as a temporary covering for the pressure sensitive, adhesive or tacky material covering the elongated flexible strip 12, and the inside portion of the flexible hinge strip 14. These gauze members, of course, may be easily removed when the flexible strip is to be put into use and are solely for the purpose of protecting the tacky coating preparatory to use.

Figure 2:
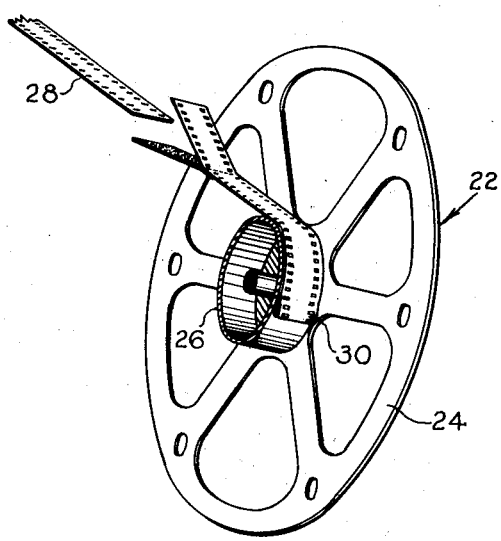
Fig. 2 is a perspective view of my film strip attachment about to be attached to a piece of film and about to be positioned on a reel.

Fig. 2 shows a conventional reel broadly designated at 22 and having flanges 24 (one of the flanges being removed for clarity of illustration) and the usual circular center portion 26 between the flanges. My film strip attachment, with the gauze elements 20, 20a and 20b removed, is shown being fastened on one end to the circular center portion of the reel and about to be fastened on the other end on the film 28. It will be noted that the gauze coverings 20, 20a and 20b have been removed and that the left-hand portion of the flexible strip 12 and the flexible hinge strip 14 form a sandwich like member permitting the film to be grasped therebetween on both side surfaces thereof by virtue of the pressure sensitive adhesive medium.

It will be noted that the right-hand end of the elongated flexible strip 12 is folded back as at 30 and this fold portion may be secured to the flat portion by any suitable means such as by stitches or by allowing the tacky surfaces to adhere as shown at 30 in the drawing. This feature permits the end of the film strip attachment to remain free of the film and in convenient position to be grasped by the operator for the purpose of loosening the film and is a convenience in disengaging the film preparatory to use after storage.

In operation motion picture films are threaded through the film projector and the film is attached to an empty reel. The customary reel has a slot or a series of slots in the circular center part or hub of the reel. The end of the film is usually bent downwardly and inserted into one of the slots so that the end of the film is secured to the reel and then the reel is rotated forwardly two or three turns so that the end of the film is secured to the reel. Of course, this procedure is unnecessary when employing the film strip attachment since the protective gauze need only be removed and the film secured in sandwich like portion of the film strip attachment and the other end of the film strip attachment simply pressed down upon the circular center of the reel. It is to be understood that any flexible material may be employed in the construction of this film strip attachment and it may be of such size as required for the particular purpose involved, depending upon the size film and reel to be used.

It is seen, therefore, that with the subject device it would only be necessary to attach the device to the end of the film and then press the end of the device down against the circular center of the reel. The adhesive coating will sufficiently anchor the end of the reel and would make it possible to use the device over many times and it may serve to hold the end of the film stationary after the film has been shown while it is stored since the end could merely be pressed onto the film in its rolled position. When the adhesive properties of the device have become so worn as to be of no further use the device could simply be cut away and a new one attached to the end of the film.

While a preferred embodiment of my invention has been described using specific terms, such description is for illustrative purposes only, and it is to be understood that changes and variations may be made without departing from the spirit or scope of the invention as defined by the appended claims.

I claim as my invention:

1. A film strip attachment for securing film to a reel comprising an elongated flexible element, adhesive means carried on one side of one end of said flexible element for securing the flexible element to a reel, a flexible strip hinged on one end to the flexible element intermediate its ends and a pressure sensitive adhesive covering the adjacent sides of said element and said strip for confining the free end of the film strip therebetween.

2. A film strip attachment for securing a motion picture film to a reel comprising a first flexible strip, a pressure sensitive adhesive coating covering one side of said first flexible strip, a second flexible hinge strip secured adjacent one of its ends to said first flexible strip intermediate the ends thereof, a pressure sensitive adhesive coating on the side of said second hinge strip facing the side of said first flexible strip covered with adhesive and a foraminous covering of textile material over the portions having pressure sensitive adhesive coating.

3. A film strip attachment for securing a motion picture film to a reel comprising a flexible strip of textile material, a pressure sensitive adhesive coating covering one side of said flexible strip, a flexible hinge strip of textile material stitched adjacent its inner end in the medial portion of said first mentioned flexible strip on said side having said pressure sensitive adhesive coating, so that adjacent ends of the hinge strip and said first mentioned flexible strip are alined, a pressure sensitive adhesive coating on the side of said hinge strip adjacent said first mentioned strip, said first mentioned flexible strip and said hinge strip having a plurality of spaced aligned slots adjacent each edge adapted to engage gear teeth for the purpose of driving the film strip through the projector and foraminous protective coverings of textile material covering the portions having pressure sensitive adhesive coating.

4. A film strip attachment as set forth in claim 3, including a tab portion, which is free of adhesive secured to the free end of said flexible strip to provide a convenient means for grasping the strip.

References Cited in the file of this patent

UNITED STATES PATENTS

| | | |
|---|---|---|
| 1,372,593 | Blackett | Mar. 22, 1921 |
| 1,438,212 | Baluta | Dec. 12, 1922 |
| 1,498,133 | Swemetal | June 17, 1924 |
| 2,119,943 | Marks | June 7, 1938 |
| 2,541,476 | Mihalyi | Feb. 13, 1951 |